United States Patent
Shah et al.

(10) Patent No.: US 10,146,964 B1
(45) Date of Patent: Dec. 4, 2018

(54) SECURITY POLICY MANAGEMENT FOR A PLURALITY OF DIES IN A SYSTEM-ON-CHIP

(71) Applicant: Intel Corporation, Santa Clara, CA (US)

(72) Inventors: Neel Shah, Billerica, MA (US); Michael Neve De Mevergnies, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/615,480

(22) Filed: Jun. 6, 2017

(51) Int. Cl.
*G06F 21/85* (2013.01)
*G06F 21/76* (2013.01)

(52) U.S. Cl.
CPC ............. *G06F 21/85* (2013.01); *G06F 21/76* (2013.01)

(58) Field of Classification Search
CPC .. H04L 63/20; H04L 63/105; G06F 17/30575
See application file for complete search history.

(56) References Cited

U.S. PATENT DOCUMENTS

| | | | |
|---|---|---|---|
| 2004/0193912 A1* | 9/2004 | Li | G06F 21/55 726/14 |
| 2013/0117803 A1* | 5/2013 | Markham | G06F 21/575 726/1 |
| 2015/0331043 A1* | 11/2015 | Sastry | G06F 21/31 714/727 |

* cited by examiner

*Primary Examiner* — Brian F Shaw
(74) *Attorney, Agent, or Firm* — Schwabe, Williamson & Wyatt, P.C.

(57) ABSTRACT

Embodiments herein relate to a die to form a system-on-chip (SOC) with one or more other dies, with a policy arbitrator disposed on the die to manage security policies of the plurality of dies of the SOC, where the PA is to receive information about a security policy and a die type from a first of the one or more other dies, compare at least the received information about the security policy and the die type of the first other die with a security policy and a die type of the die, determine, based on the comparison, a common security policy for the plurality of dies of the SOC, and transmit the determined common security policy and the die type of the die to at least a second of the one or more other dies.

25 Claims, 5 Drawing Sheets

DFx Policy

| Policy # | Policy Name |
|---|---|
| 0000 | Green |
| 1 | Lockdown |
| 2 | Unlocked |
| 3 | Other |
| 4 | Other |
| 5 | Other |
| 6 | Other |
| 7 | Other |
| 8 | Other |
| 9 | Other |
| A | Other |
| B | Other |
| C | Other |
| D | Other |
| E | Other |
| F | Other |

400

FIG. 4

SECURITY POLICY MANAGEMENT FOR A PLURALITY OF DIES IN A SYSTEM-ON-CHIP

FIELD

Embodiments of the present disclosure generally relate to the field of integrated circuits, and in particular system-on-chip (SOC) assemblies having multiple split dies or re-used subsystems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

As transistor sizes continue to shrink, this may result in more complex manufacturing processes required to create a system on-chip (SOC), and may result in long manufacturing process hold times. To overcome these manufacturing difficulties, replicating multiple dies on the same package to create a SOC has been used to reduce the overall die size.

BRIEF DESCRIPTION OF THE DRAWINGS

FIG. 4 illustrates example policies, in accordance with embodiments.

DETAILED DESCRIPTION

Figure 1:
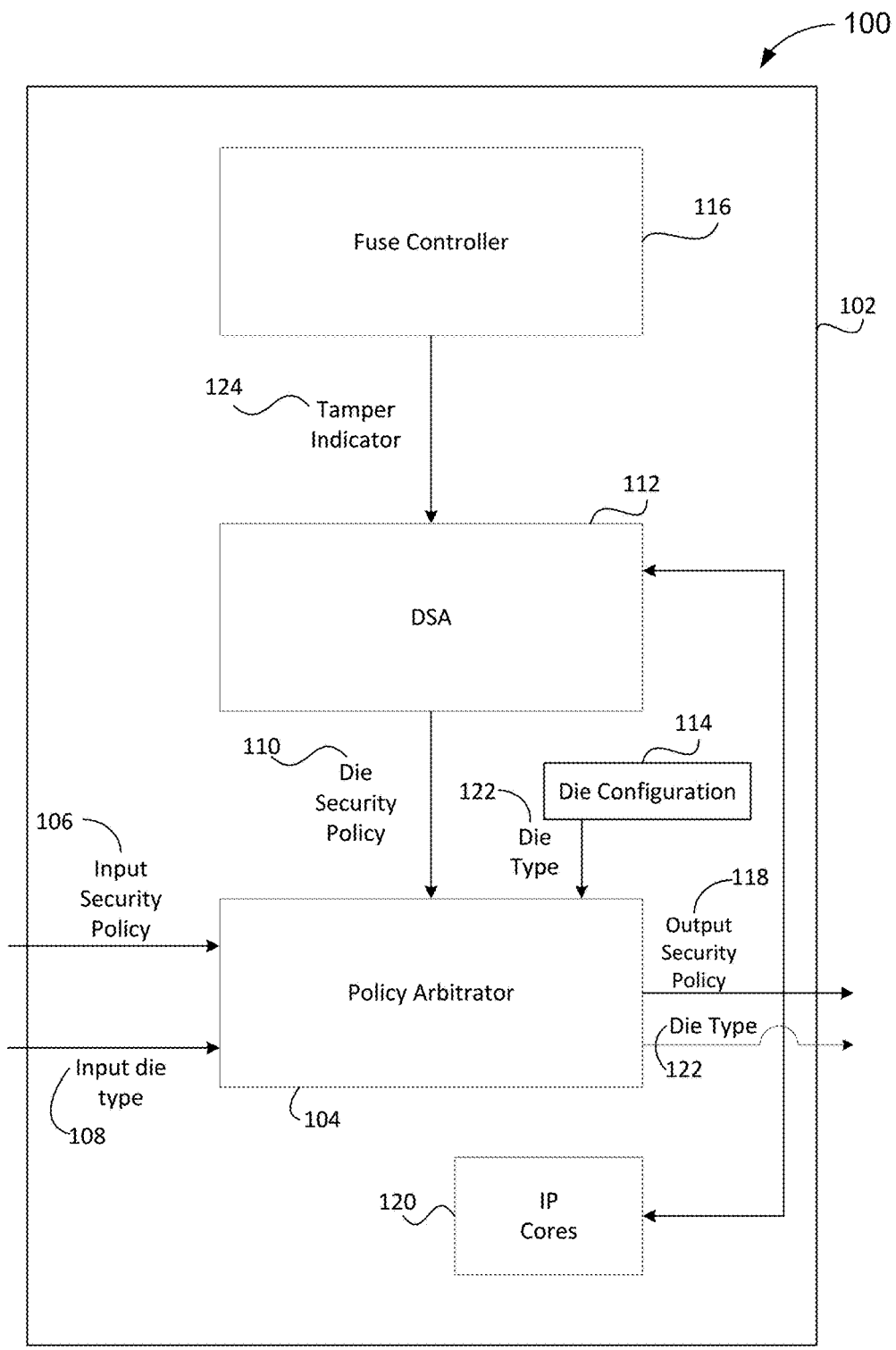
FIG. 1 schematically illustrates security aspects of an example die of a SOC, in accordance with embodiments.

Embodiments of the present disclosure may include systems, methods, or processes to coordinate multiple design-for-manufacturability anything (DFx) security policies across respective multiple DFx Security Aggregators (DSAs) on multiple dies. This coordination may include synchronizing, by a policy arbitrator (PA), the multiple DSA security policies across the multiple dies or subsystems to create a single security policy for the multiple dies. These multiple dies may be stitched together into one SOC, in which case the synchronized security policy would set the single security policy for the whole SOC. In embodiments, the PA may analyze the policies in the multiple DSAs to determine if there are any errors or unknown states within an individual die, and may arbitrate to provide a master policy for all dies on the SOC. This may result in the synchronized DFx security policy that will be honored by all intellectual property (IP) cores on the SOC.

In embodiments, the multiple dies may be part of a split-die architecture of a SOC, where a monolithic die may be split into smaller dies, for example, to increase yield during the manufacturing process. The smaller dies, which may also be referred to as split dies, may be stitched together via an embedded multi-die interconnect bridge (EMIB), which may also be referred to as an EMIB interconnect, or via some other interconnect process so that the smaller dies may operate and/or appear as a monolithic die. In embodiments, each die within the SOC package may work as if they are one logical die from either the end-user or an original equipment manufacturers (OEMs) perspective, with each die working seamlessly without any modification. In embodiments, this architecture may also apply to Super Hardened IP (HIP)-mini-SOCs as subsystems, that may refer to a mast layout that may be re-used as-is such that the HIP may not go through synthesis, placement and routing, but that may result in a collection of IP cores that may be packaged. In embodiments, the PA and/or DSA may exist on the subsystems and synchronize the DSA policy across the different subsystems.

In embodiments, the synchronized DFx security policy may be trusted by all the reusable logic units (also referred to as intellectual property, or IP, cores) within the multiple dies to make access control decisions, for example, to enable or disable debug capabilities, to control the use of production keys vs. dummy keys, to determine when debug is enabled, and the like.

For individual dies, the DFx security architecture may be based on one central DSA IP core that controls the product's DFx security policy, therefore, all debug features and security assets. All IP cores within the dies use the DFx security policy to enable/disable their debug and security features. Multiple dies within SOC may mean multiple DSAs, and therefore multiple DFx security policies, within the SOC.

In a subset of embodiments, every die may be designated as either a master die or a slave die. In master/slave embodiments, the DSA of a master die may govern the final security policy for the SOC, unless any slave die DSAs indicate, for example, that the die has had any kind of an error such as a fuse error, is in an unknown state, or is under attack. For example, when a DSA has a fuse error due to tampering or interference, PA logic may restrict the DFx policy for the SOC to a "Lockdown" policy, which may indicate the most restrictive policy to indicate that the die is in the most controlled state. The PA logic, once determining a Lockdown policy, may notify all IP cores in the SOC of the Lockdown policy so that IP core assets (e.g., register values) may be protected. For example, in a Lockdown policy, IP cores may allow minimum to no debug visibility, therefore protecting their security assets. In embodiments, the SOC boot may also be halted.

In embodiments, sending this security policy to all IP cores may enforce security with respect to after-manufactured testing using devices, methods, and/or processes related to the Joint Test Action Group (JTAG) standards. This may also include enforcing security for a test access port (TAP) on a die that may allow debug access to the die. This may also include other die debug mechanisms such as tracing, triggering, break-pointing, debug control/status registers, etc. A coordinated security policy may address a threat that may range from simple to advanced physical hardware attackers, who may have the ability to intercept a link between the two dies and inject/probe a DFx security policy to either steal assets, for example, keys or Read Only Memory (ROM) code, or to perform privileged operations via debug hooks.

An example of a threat may include protecting an IP core's control registers, which may be referred to as an example set of assets, against unauthorized accesses while the SOC or an individual die within the SOC is being debugged. These registers can be accessed either through JTAG or TAP by a security check via DFx policy. The IP core may decode the incoming policy over a DFx secure bus and enable, for example, turning on a master switch for a particular DFx feature that may provide high-level features such as debug access to restricted IP cores. As an example, in a Security Locked or "green" policy, the DFx feature enable may be turned off. This may result in the IP core's registers either not accessible through TAP or may result in having no effect as the DFx feature may be disabled by the plug-in.

For example, if the DFx security plug-in turns on a master switch, then the IP core's core registers may be accessible when accessed through TAP, and the specialized threat analysis and protection's (STAP's) DFx security plug-in may enforce which TAP instructions are permitted to access the core registers depending on the debug policy (e.g., Security Unlocked, Intel Unlocked, etc.). In embodiments, this access may include any fabric-to-TAP bridge.

The result of embodiments of the PA may be that the entire SOC, and all of the dies that make up the SOC, may all be in the same debug state. This may avoid threats from attack to the SOC that may arise from different security policies within different dies that may result in tampering with one die to get access to IP cores of other dies.

Additionally, embodiments may scale well as the PA may handle an arbitrary number of DSAs when one DSA is defined as a master and others are slaves. In embodiments, the designation of a die as a master or slave may be static and/or deterministic, and may be done at the time of manufacture of the die. In embodiments, the master or slave designation may be done dynamically, for example, based on the health of the individual dies in a single SOC package where the master die may be chosen based on its longest expected life.

In embodiments, the master die may reside on the lowest power well, so that the master die DSA security policy is established as soon as power becomes available, very early in the boot flow.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 schematically illustrates security aspects of a die of a SOC, in accordance with embodiments. Diagram 100 may show one or more processes within a die 102. In embodiments, the die 102 may be one of a plurality of dies (not shown) that make up a SOC. In embodiments, the die 102 may include PA 104, DSA 112 and fuse controller (FC) 116 coupled with each other, and complementarily incorporated with the security policy management technology of the present disclosure.

In embodiments, the PA 104 may receive an input security policy 106 from a first other die, or simply first die (not shown) of the SOC, and an input die type 108 from the first die. The PA 104 may further receive a die security policy 110 for the die 102 from the DSA 112, and a die type 122 of the die 102 from a die configuration 114. In embodiments, the PA 104 may be implemented in circuitry on the die 102. From these inputs, the PA 104 may determine an output security policy 118, which may also be referred to as a common security policy that may be used to update the die policy within the DSA 112 and/or update the die policy used by the IP cores 120 of die 102. The output common security policy (or simply, security policy) 118 may also be sent to a second die (not shown) of the SOC for use by the second die. In embodiments, the PA 104 may also provide an output die type 122 to the second die (not shown). In embodiments, the DSA 112 may be implemented as an IP core. In embodiments, the first and second dies (not shown) may be the same die, for example, when a SOC includes only two dies.

In embodiments, FC 116 may be used to detect any tampering or abnormal conditions detected by on-die or off-die logic (not shown) with the die 102. In embodiments, the FC 116 and DSA 112 may be directly coupled, so that an error detected by the FC 116 may immediately update the DFx security policy in the DSA 112 to indicate that die 102 may not be reliable and should not be trusted. Other indications of tampering or abnormal conditions may include under- or over-voltage, results from error detection logic such as error-correcting code (ECC) memory, triggering, a transmission error being detected, etc., some of which may be detected by the FC 116. In embodiments, if the FC 116 detects die tampering, the DFx die policy stored within the DSA 112 may be set to indicate tampering. In the case of a FC 116 detecting a fuse-related error, the DSA 112 may remain enabled and may send a notification via a security policy to all IP cores 120 on the die 102, or other dies within the SOC. In embodiments, the notification may cause booting of the dies and/or the SOC to be halted. In embodiments, the DSA 112 may remain enabled to react to cases in which the paired FC 116 may indicate related errors, such as errors that may be indicated by the tamper indicator 124 from the FC 116.

Figure 2:
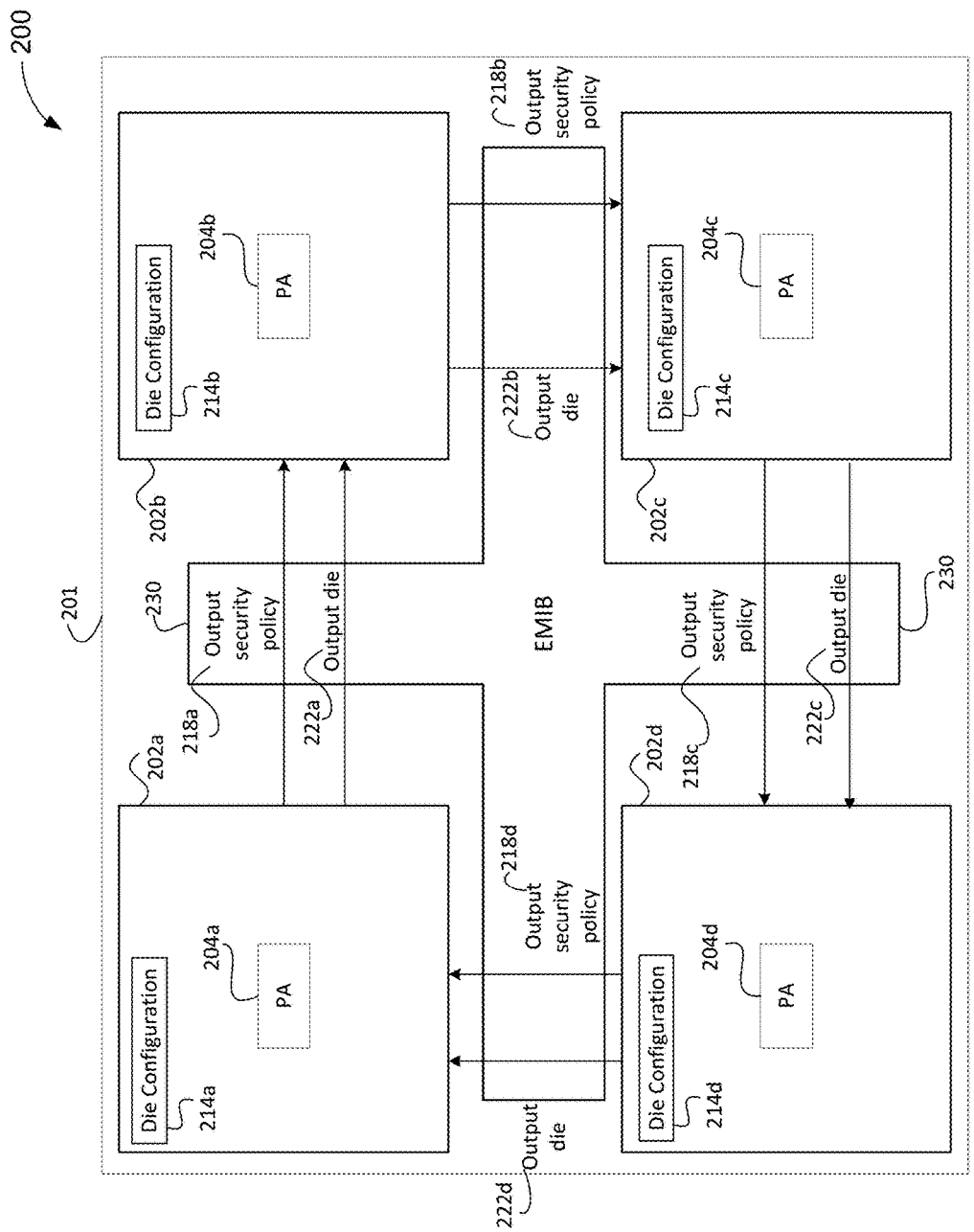
FIG. 2 schematically illustrates an example of a SOC having a plurality of dies, in accordance with embodiments.

FIG. 2 schematically illustrates an example of a SOC having a plurality of dies, in accordance with embodiments.

Diagram 200 may show an example of a SOC 201 that may include a master die 202a and three slave dies 202b, 202c, 202d. The dies 202a-202d may be similar to die 102 of FIG. 1. Note, in embodiments the number of dies may not be limited to four, and may be any number of dies. The dies 202a-202d may be connected, which may also be referred to as stitched together, by a network that is to cause the dies 202a-202d to function together as a SOC 201. In embodiments, this network may be implemented as an EMIB 230. In embodiments, each of the dies 202a-202d may have a die configuration 214a-214d which may provide information on a particular die's role with respect to security policy. For example, the die configuration 214a, which may be similar to the die configuration 114 of FIG. 1, of die 202a may indicate that die 202a is a master die for the SOC, with the other dies 202b-202d serving as slave dies. In embodiments, the die configuration 214a-214d may be determined at the time the die is manufactured. In embodiments, the die configuration 214a-214d may be determined dynamically among the dies 202b-202d based on other criteria.

As shown, the output security policy 218a from the PA 204a in addition to the output die type 222a of master die 202a may be sent to the PA 204b of die 202b via the EMIB 230. The PAs 204c, 204d may operate in an analogous fashion. In embodiments, the output security policies 218a-218d and output die types 222a-222d may be sent via the EMIB 230 in a token ring fashion from die to die. In embodiments, EMIB 230 may be implemented as a mesh network, or implemented as any other suitable network.

In embodiments, the EMIB 230 may send an output security policy 218a from one die 202a to another die 202b by a set of individual wires (not shown). Note, in embodiments, the dies 202a-202d, may be referred to and/or implemented as a subsystem, and may be referred to as a node. For example, if an output security policy 218a is one of 16 different policy choices, then the identity of the policy may be represented by a nibble (four binary digits). The nibble may then be communicated from one die 202a to another die 202b by four wires (not shown), each indicating a binary digit of the nibble that indicates the output security policy 218a. Similarly, the master or slave status of the output die 222a may be communicated from one die 202a to another die 202b by a single wire (not shown), indicating a "1" for a master and "0" for a slave. In embodiments, the EMIB 230 may transfer data either synchronously or asynchronously.

Figure 3:
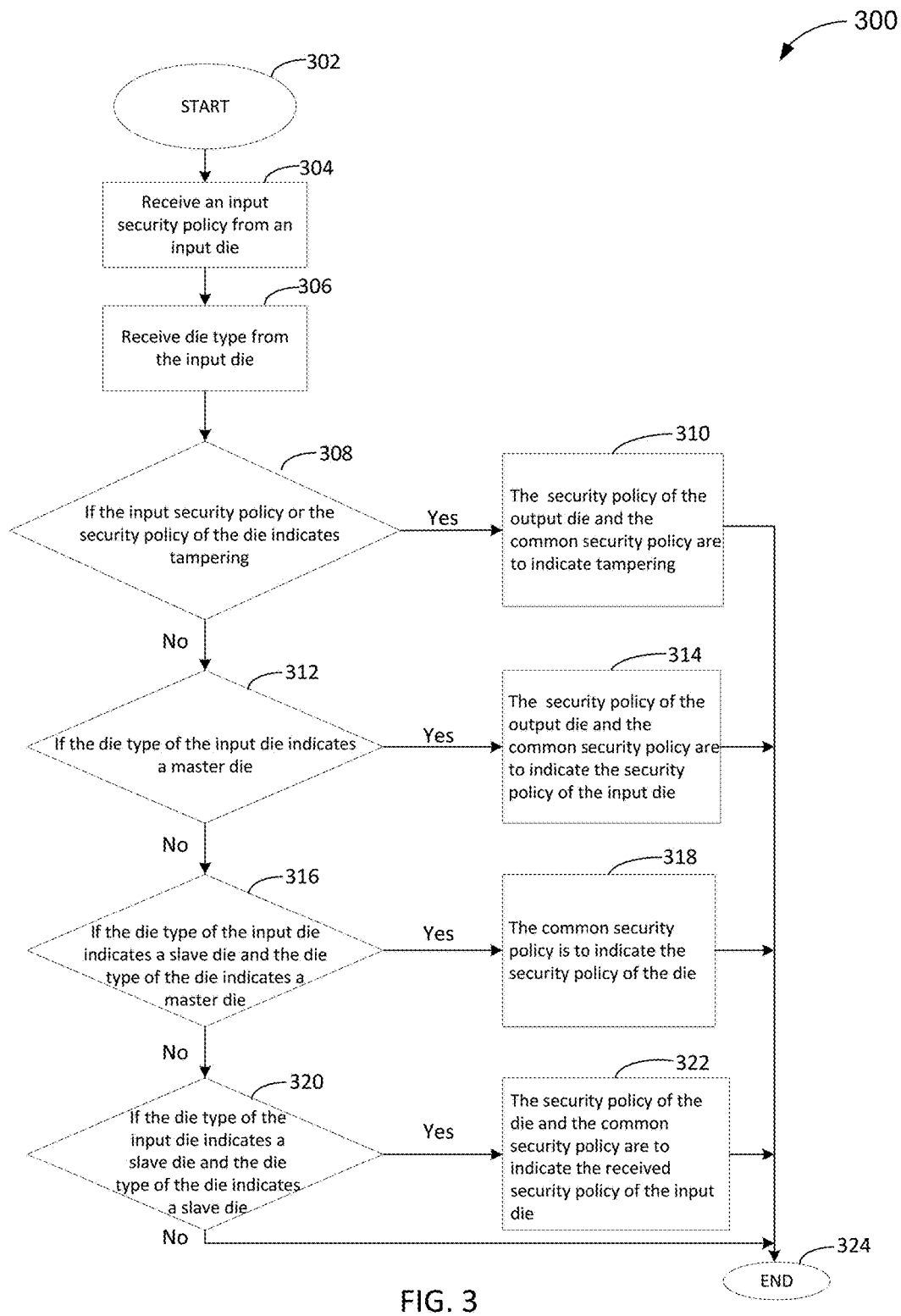
FIG. 3 illustrates an example of a process for operating a policy arbitrator (PA) in a die, in accordance with embodiments.

FIG. 3 illustrates an example of a process for operating PA in a die, in accordance with embodiments. The process 300 may start at block 302.

At block 304, an input security policy may be received by the PA from an input die. In embodiments, the input security policy may be similar to input security policy 106 of FIG. 1. In embodiments, the input security policy may be received from another die over an EMIB connection such as EMIB connection 230 of FIG. 2. The input security policy may, for example, be one of the security policies given in diagram 400 of FIG. 4.

At block 306, an input die type may be received by the PA from an input die. In embodiments, the input die type, which may be similar to input die type 108 of FIG. 1, may be received from another die over an EMIB connection such as EMIB connection 230 of FIG. 2. In embodiments, the input die type may be one of master or slave.

At block 308, a determination may be made by the PA on whether the input security policy or the security policy of the die indicates tampering. In embodiments, this determination may be based on the input security policy 106 and the die type 122 of FIG. 1. In embodiments, an indication of tampering may be determined by the fuse controller 116, which may then communicate this tampering to the DSA 112 of FIG. 1, which may then set the die security policy 110 within the DSA 112 to indicate tampering. Additional examples of tampering that may cause such an indication may include, in addition to those given above, conditions of temperature out-of-spec, voltage glitches, current glitches, and/or clock frequency out of range. In embodiments, resistive, capacitive, or inductive detectors (not shown) may be used to monitor physical properties of the die to determine reverse engineering activities, for example, using chemicals, focus ion beams, probes, or laser attacks to attempt to access the die.

If a result of the determination at block 308 is affirmative, then at block 310 the security policy of the output die and the common security policy may be set to indicate tampering. In embodiments, the PA 104 may set the common security policy stored within the DSA 112 to indicate tampering, and set the output security policy 118 to indicate tampering. At block 324, the process may end.

If a result of the determination at block 308 is negative, at block 312, a determination may be made by the PA on whether the die type of the input die indicates a master die. In embodiments, the die type of the input die may be similar to the input die type 108 of FIG. 1.

If a result of the determination at block 312 is affirmative, then at block 314 the security policy of the output die and the common security policy may be set to indicate the security policy of the input die. In embodiments, the PA 104 may store the common security policy in the DSA 112, and set the output security policy 118 to the common security policy. At block 324, the process may end.

If a result of the determination at block 312 is negative, at block 316 a determination may be made by the PA on whether the die type of the input die indicates a slave die and the die type of the die indicates a master die. In embodiments, the die type of the input die may be similar to the input die type 108 and the die type of the die may be similar to die type 122 of FIG. 1.

If a result of the determination at block 316 is affirmative, then at block 318 the common security policy may be set to indicate the security policy of the die. In embodiments, the PA 104 may store the common security policy in the DSA 112, and set the output security policy 118 to the common security policy. At block 324, the process may end.

If a result of the determination at block 316 is negative, at block 320, a determination may be made by the PA on whether the die type of the input die indicates a slave die and the die type of the die indicates a slave die. In embodiments, the die type of the input die may be similar to the input die type 108 and the die type of the die may be similar to die type 122 of FIG. 1.

If a result of the determination at block 320 is affirmative, then at block 322 the security policy of the die and the common security policy may be set to indicate the received security policy of the input die. In embodiments, the received security policy may be similar to the received input security policy 106 of FIG. 1. In embodiments, the PA 104 may store the common security policy in the DSA 112, and set the output security policy 118 to the common security policy. At block 324, the process may end. Similarly, if a result of the determination at block 320 is negative, the process may also end at block 324.

FIG. 4 illustrates example policies, in accordance with embodiments. Diagram 400 shows an example of 16 security policies that may be implemented as a DFx security policy that may be stored in a DSA, for example, DSA 112 of FIG. 1. In this example, the 16 security policies, for example, 0 through F (in hexadecimal), may be associated with various security policies. For example, "0" may be associated with "Green," which may indicate a normal operation for the die 102. In another example, "1" may indicate a "Lockdown" security policy that may be used to indicate that one of the dies, for example, one of dies 202a-202d, may have been tampered with and therefore the common security policy of the SOC, such as SOC 201 of FIG. 2, is to be set to "Lockdown" to prevent any further tampering with any of the dies 202a-202d.

Figure 5:
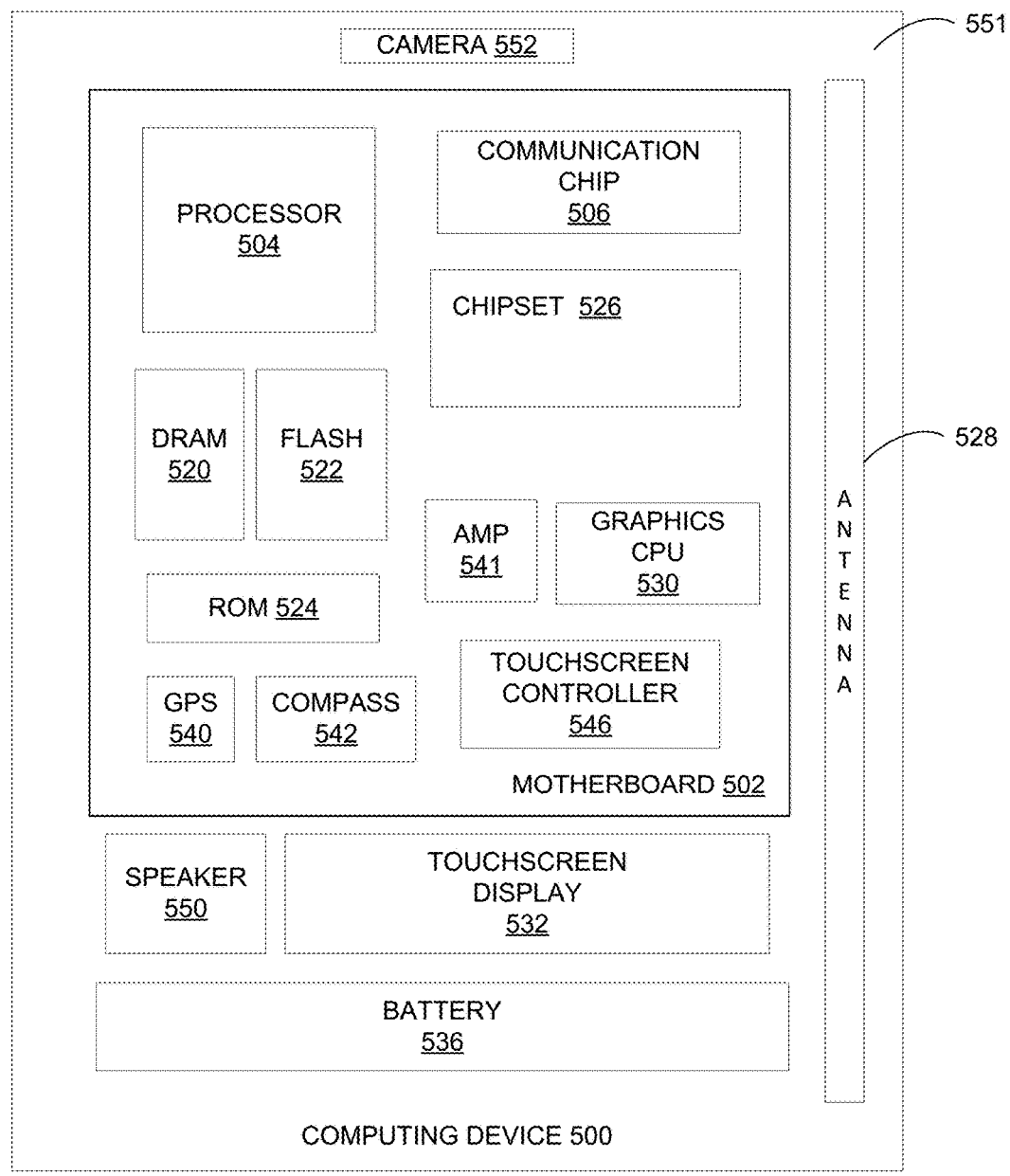
FIG. 5 schematically illustrates a computing device, in accordance with embodiments.

FIG. 5 schematically illustrates a computing device, in accordance with embodiments. Embodiments of the present disclosure may be implemented into a system using any suitable hardware and/or software to configure as desired. FIG. 5 schematically illustrates a computing device 500 in accordance with one embodiment. The computing device 500 may house a board such as motherboard 502 (i.e., housing 551). The motherboard 502 may include a number of components, including but not limited to a processor 504 and at least one communication chip 506. The processor 504 may be physically and electrically coupled to the motherboard 502. In some implementations, the at least one communication chip 506 may also be physically and electrically coupled to the motherboard 502. In further implementations, the communication chip 506 may be part of the processor 504.

Depending on its applications, computing device 500 may include other components that may or may not be physically and electrically coupled to the motherboard 502. These other components may include, but are not limited to, volatile memory (e.g., Dynamic Random Access Memory (DRAM)) 520, non-volatile memory (e.g., ROM) 524, flash memory 522, a graphics processor 530, a digital signal processor (not shown), a crypto processor (not shown), a chipset 526, an antenna 528, a display (not shown), a touchscreen display 532, a touchscreen controller 546, a battery 536, an audio codec (not shown), a video codec (not shown), a power amplifier 541, a global positioning system (GPS) device 540, a compass 542, an accelerometer (not shown), a gyroscope (not shown), a speaker 550, a camera 552, and a mass storage device (such as hard disk drive, compact disk (CD), digital versatile disk (DVD), and so forth) (not shown).

The communication chip 506 may enable wireless communications for the transfer of data to and from the computing device 500. The term "wireless" and its derivatives may be used to describe circuits, devices, systems, processes, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Networks (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 506 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 506 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 306 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 506 may operate in accordance with other wireless protocols in other embodiments.

The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, EV-DO, and others.

In embodiments, chipset 526 may be a SOC such as SOC 201 having one or more dies 102 or 202a-202d, as earlier described. In other embodiments, the processor 504 together with one or more other components, such as DRAM 520, flash 522, communication chip 506, graphics Central Processing Unit (CPU) 530, and so forth, may be a SOC such as SOC 201 having one or more dies 102 or 202a-202d, as earlier described. The term "processor" may refer to any device or portion of a device that processes electronic data from registers and/or memory to transform that electronic data into other electronic data that may be stored in registers and/or memory.

In various implementations, the computing device 500 may be a laptop, a netbook, a notebook, an Ultrabook™, a smartphone, a tablet, a personal digital assistant (PDA), an ultra-mobile PC, a mobile phone, a desktop computer, a server, a printer, a scanner, a monitor, a set-top box, an entertainment control unit, a digital camera, a portable music player, or a digital video recorder. In further implementations, the computing device 500 may be any other electronic device that processes data, for example, an all-in-one device such as an all-in-one fax or printing device.

EXAMPLES

The following paragraphs describe examples of various embodiments:

Example 1 may be a system-on-chip (SOC) apparatus comprising: die to form the SOC with one or more other dies; and a policy arbitrator (PA) disposed on the die to manage security policies of the plurality of dies of the SOC; wherein the PA is to: receive information about a security policy and a die type from a first of the one or more other dies; compare at least the received information about the security policy, and the die type of the first other die, with a security policy and a die type of the die; determine, based on the comparison, a common security policy for the plurality of dies of the SOC; and transmit the determined common security policy and the die type of the die to at least a second of the one or more other dies.

Example 2 may include the apparatus of example 1, wherein the die or the one or more other dies is a subsystem of the SOC.

Example 3 may include the apparatus of example 1, wherein determine a common security policy for the plurality of dies of the SOC further includes if the security policy of the first other die or the security policy of the die indicates tampering, then the security policy of the die and the common security policy are to indicate tampering.

Example 4 may include the apparatus of example 3, wherein the indication of tampering is to cause the die to not boot.

Example 5 may include the apparatus of example 3, wherein a security policy to indicate tapering is a Lockdown policy.

Example 6 may include the apparatus of example 1, wherein determine a common security policy for the plurality of dies of the SOC further includes if the die type of the first other die indicates a master die, then the security policy of the die and the common security policy are to indicate the security policy of the first other die.

Example 7 may include the apparatus of example 1, wherein determine a common security policy for the plurality of dies of the SOC further includes if the die type of the first other die indicates a slave die and the die type of the die indicates a master die, then the common security policy is to indicate the security policy of the die.

Example 8 may include the apparatus of example 1, wherein determine a common security policy for the plurality of dies of the SOC further includes if the die type of the first other die indicates a slave die and the die type of the die indicates a slave die, then the security policy of the die and the common security policy are to indicate the received security policy of the first other die.

Example 9 may include the apparatus of example 1, wherein one or more of the other dies respectively comprise one or more intellectual property (IP) cores; and wherein the PA is further to transmit the common security policy to the one or more IP cores of one or more of the other dies.

Example 10 may include the apparatus of example 1, further comprising a DFx Security Aggregator (DSA) disposed on the die and coupled to the PA, to store the security policy of the die.

Example 11 may include the apparatus of example 10, further comprising a fuse controller (FC) disposed on the die and coupled to the DSA, to detect tampering with the die, wherein if the FC indicates tampering with the die, the die policy stored on the DSA is to indicate tampering.

Example 12 may include the apparatus of any one of examples 1-10, wherein the die is a split die.

Example 13 may include the apparatus of any one of examples 1-10, wherein the received security policy, the security policy of the die, and the common security policy include one of 16 policies.

Example 14 may include the apparatus of any one of examples 1-10, wherein to receive or to transmit further includes to receive or transmit using an embedded multi-die interconnect bridge (EMIB).

Example 15 may include the apparatus of any one of examples 1-10, wherein to receive or to transmit further includes to receive or to transmit using a token ring or a mesh network protocol.

Example 16 may include the apparatus of any one of examples 1-10, wherein to receive or to transmit are performed asynchronously.

Example 17 may include the apparatus of any one of examples 1-10, wherein the first other die and the second other die are a same die.

Example 18 may be a system on a chip (SOC) comprising: a plurality of dies that are interconnected wherein each of the plurality of dies has a die type; a policy arbitrator (PA) to manage security policies of the plurality of dies; wherein the PA is to: receive information about a security policy and a die type from a first of the plurality of dies; compare at least the received information about the security policy, and the die type of the first die, with a security policy and a die type of a second of the plurality of dies; determine, based on the comparison, a common security policy for the SOC; and transmit the determined common security policy and the die type of the second die to at least a third of the one or more plurality of dies.

Example 19 may include the system of example 18, wherein the PA is disposed on the second of the plurality of dies.

Example 20 may include the system of example 18, wherein the second die and the third die are a same die.

Example 21 may include the system of example 18, wherein one of the plurality of dies is a subsystem of the SOC.

Example 22 may include the system of example 18, wherein determine a common security policy for the plurality of dies of the SOC further includes if the security policy of the first other die or the security policy of the die indicates tampering, then the security policy of the die and the common security policy are to indicate tampering.

Example 23 may include the system of example 18, wherein determine a common security policy for the plurality of dies of the SOC further includes if the die type of the first other die indicates a master die, then the security policy of the die and the common security policy are to indicate the security policy of the first other die.

Example 24 may include the system of example 18, wherein determine a common security policy for the plurality of dies of the SOC further includes if the die type of the first other die indicates a slave die and the die type of the die indicates a master die, then the common security policy is to indicate the security policy of the die.

Example 25 may include the system of example 18, wherein determine a common security policy for the plurality of dies of the SOC further includes if the die type of the first other die indicates a slave die and the die type of the die indicates a slave die, then the security policy of the die and the common security policy are to indicate the received security policy of the first other die.

Example 26 may include the system of example 18, wherein one or more of the plurality of dies respectively comprise one or more intellectual property (IP) cores; and wherein the PA is further to transmit the common security policy to the one or more IP cores of one or more of the plurality of dies.

Example 27 may include the system of example 18, further comprising a DFx Security Aggregator (DSA) disposed on the second die and coupled to the PA, to store the security policy of the die.

Example 28 may include the system of example 27, further comprising a fuse controller (FC) disposed on the second die and coupled to the DSA, to detect tampering with the die, wherein if the FC indicates tampering with the die, the die policy stored on the DSA is to indicate tampering.

Example 29 may include the system of any one of examples 18-27, wherein one of the plurality of dies is a split die.

Example 30 may include the system of any one of examples 18-27, wherein to receive or to transmit further includes to receive or transmit using an embedded multi-die interconnect bridge (EMIB).

Example 31 may include the system of any one of examples 18-27, wherein to receive or to transmit further includes to receive or to transmit using a token ring or a mesh network protocol.

Example 32 may be a method for implementing a policy arbitrator (PA), comprising: receiving information about a security policy and a die type from a first of one or more other dies of a system-on-chip (SOC); comparing at least the received information about the security policy, and the die type of the first other die, with a security policy and a die type of a die; determining, based on the comparison, a common security policy for the plurality of dies of the SOC; and transmitting the determined common security policy and the die type of the die to at least a second of the one or more other dies.

Example 33 may include the method of example 32, wherein the die or one of the one or more other dies is a subsystem of the SOC.

Example 34 may include the method of example 32, wherein determining a common security policy for the plurality of dies of the SOC further includes if the security policy of the first other die or the security policy of the die indicates tampering, then determining the security policy of the die and the common security policy to indicate tampering.

Example 35 may include the method of example 32, wherein determining a common security policy for the plurality of dies of the SOC further includes if the die type of the first other die indicates a master die, then determining the security policy of the die and the common security policy to indicate the security policy of the first other die.

Example 36 may include the method of example 32, wherein determining a common security policy for the plurality of dies of the SOC further includes if the die type of the first other die indicates a slave die and the die type of the die indicates a master die, then determining the common security policy to indicate the security policy of the die.

Example 37 may include the method of example 32, wherein determining a common security policy for the plurality of dies of the SOC further includes if the die type of the first other die indicates a slave die and the die type of the die indicates a slave die, then determining the security policy of the die and the common security policy to indicate the received security policy of the first other die.

Example 38 may include the method of example 32, wherein the PA further comprises transmitting the common security policy to one or more intellectual property (IP) cores of the die.

Example 39 may include the method of example 32, further comprising storing the security policy of the die on a DFx Security Aggregator (DSA) disposed on the die.

Example 40 may include the method of any one of examples 32-39, wherein receiving or transmitting further includes receiving or transmitting over an embedded multi-die interconnect bridge (EMIB).

Example 41 may include the method of any one of examples 32-39, wherein receiving or transmitting further includes receiving or transmitting using a token ring or a mesh network protocol.

Example 42 may include the method of any one of examples 32-39, wherein the first other die and the second other die are a same die.

Example 43 may be an apparatus for implementing a policy arbitrator (PA), comprising: means for receiving information about a security policy and a die type from a first of one or more other dies on a system-on-chip (SOC); means for comparing at least the received information about the security policy, and the die type of the first other die, with a security policy and a die type of a die; means for determining, based on the comparison, a common security policy for the plurality of dies of the SOC; and means for transmitting the determined common security policy and the die type of the die to at least a second of the one or more other dies.

Example 44 may include the apparatus of example 43, wherein the die or one of the one or more other dies is a subsystem of the SOC.

Example 45 may include the apparatus of example 43, wherein determining a common security policy for the plurality of dies of the SOC further includes if the security policy of the first other die or the security policy of the die indicates tampering, then means for determining the security policy of the die and the common security policy to indicate tampering.

Example 46 may include the apparatus of example 43, wherein determining a common security policy for the plurality of dies of the SOC further includes if the die type of the first other die indicates a master die, then means for determining the security policy of the die and the common security policy to indicate the security policy of the first other die.

Example 47 may include the apparatus of example 43, wherein determining a common security policy for the plurality of dies of the SOC further includes if the die type of the first other die indicates a slave die and the die type of the die indicates a master die, then means for determining the common security policy to indicate the security policy of the die.

Example 48 may include the apparatus of example 43, wherein determining a common security policy for the plurality of dies of the SOC further includes if the die type of the first other die indicates a slave die and the die type of the die indicates a slave die, then means for determining the security policy of the die and the common security policy to indicate the received security policy of the first other die.

Example 49 may include the apparatus of example 43, further comprising means for transmitting the common security policy to one or more intellectual property (IP) cores.

Example 50 may include the apparatus of example 43, further comprising means for storing the security policy of the die on a DFx Security Aggregator (DSA) disposed on the die.

Example 51 may include the apparatus of any one of examples 43-50, wherein receiving or transmitting further includes means for receiving or means for transmitting over an embedded multi-die interconnect bridge (EMIB).

Example 52 may include the apparatus of any one of examples 43-50, wherein receiving or transmitting further includes means for receiving or means for transmitting using a token ring or a mesh network protocol.

Example 53 may include the apparatus of any one of examples 43-50, wherein the first other die and the second other die are a same die.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

What is claimed is:

1. A system-on-chip (SOC) apparatus comprising:
a die to form the SOC with one or more other dies; and
a policy arbitrator (PA) disposed on the die to manage security policies of the plurality of dies of the SOC; wherein the PA is to:
receive information about a security policy and a die type from a first of the one or more other dies;
compare at least the received information about the security policy, and the die type of the first other die, with a security policy and a die type of the die;
determine, based on the comparison, a common security policy for the plurality of dies of the SOC; and
transmit the determined common security policy and the die type of the die to at least a second of the one or more other dies.

2. The apparatus of claim 1, wherein the die or the one or more other dies is a subsystem of the SOC.

3. The apparatus of claim 1, wherein determine a common security policy for the plurality of dies of the SOC further includes if the security policy of the first other die or the security policy of the die indicates tampering, then the security policy of the die and the common security policy are to indicate tampering.

4. The apparatus of claim 3, wherein the indication of tampering is to cause the die to not boot.

5. The apparatus of claim 3, wherein a security policy to indicate tapering is a Lockdown policy.

6. The apparatus of claim 1, wherein determine a common security policy for the plurality of dies of the SOC further includes if the die type of the first other die indicates a master die, then the security policy of the die and the common security policy are to indicate the security policy of the first other die.

7. The apparatus of claim 1, wherein determine a common security policy for the plurality of dies of the SOC further includes if the die type of the first other die indicates a slave die and the die type of the die indicates a master die, then the common security policy is to indicate the security policy of the die.

8. The apparatus of claim 1, wherein determine a common security policy for the plurality of dies of the SOC further includes if the die type of the first other die indicates a slave die and the die type of the die indicates a slave die, then the security policy of the die and the common security policy are to indicate the received security policy of the first other die.

9. The apparatus of claim 1, wherein one or more of the other dies respectively comprise one or more intellectual property (IP) cores; and wherein the PA is further to transmit the common security policy to the one or more IP cores of one or more of the other dies.

10. The apparatus of claim 1, further comprising a DFx Security Aggregator (DSA) disposed on the die and coupled to the PA, to store the security policy of the die.

11. The apparatus of claim 10, further comprising a fuse controller (FC) disposed on the die and coupled to the DSA, to detect tampering with the die, wherein if the FC indicates tampering with the die, the die policy stored on the DSA is to indicate tampering.

12. The apparatus of any one of claims 1-10, wherein the die is a split die.

13. A system on a chip (SOC) comprising:
a plurality of dies that are interconnected wherein each of the plurality of dies has a die type;
a policy arbitrator (PA) to manage security policies of the plurality of dies; wherein the PA is to:
receive information about a security policy and a die type from a first of the plurality of dies;
compare at least the received information about the security policy, and the die type of the first die, with a security policy and a die type of a second of the plurality of dies;
determine, based on the comparison, a common security policy for the SOC; and
transmit the determined common security policy and the die type of the second die to at least a third of the one or more plurality of dies.

14. The system of claim 13, wherein the PA is disposed on the second of the plurality of dies.

15. The system of claim 13, wherein the second die and the third die are a same die.

16. The system of claim 13, wherein one of the plurality of dies is a subsystem of the SOC.

17. The system of claim 13, wherein determine a common security policy for the plurality of dies of the SOC further includes if the security policy of the first other die or the security policy of the die indicates tampering, then the security policy of the die and the common security policy are to indicate tampering.

18. The system of claim 13, wherein determine a common security policy for the plurality of dies of the SOC further includes if the die type of the first other die indicates a master die, then the security policy of the die and the common security policy are to indicate the security policy of the first other die.

19. The system of claim 13, wherein determine a common security policy for the plurality of dies of the SOC further includes if the die type of the first other die indicates a slave die and the die type of the die indicates a master die, then the common security policy is to indicate the security policy of the die.

20. The system of claim 13, wherein determine a common security policy for the plurality of dies of the SOC further includes if the die type of the first other die indicates a slave die and the die type of the die indicates a slave die, then the security policy of the die and the common security policy are to indicate the received security policy of the first other die.

21. The system of claim 13, wherein one or more of the plurality of dies respectively comprise one or more intellectual property (IP) cores; and wherein the PA is further to transmit the common security policy to the one or more IP cores of one or more of the plurality of dies.

22. The system of claim 13, further comprising a DFx Security Aggregator (DSA) disposed on the second die and coupled to the PA, to store the security policy of the die.

23. A method for implementing a policy arbitrator (PA), comprising:
   receiving information about a security policy and a die type from a first of one or more other dies of a system-on-chip (SOC);
   comparing at least the received information about the security policy, and the die type of the first other die, with a security policy and a die type of a die;
   determining, based on the comparison, a common security policy for the plurality of dies of the SOC; and
   transmitting the determined common security policy and the die type of the die to at least a second of the one or more other dies.

24. The method of claim 23, wherein the die or one of the one or more other dies is a subsystem of the SOC.

25. The method of claim 23, wherein determining a common security policy for the plurality of dies of the SOC further includes:
   if the security policy of the first other die or the security policy of the die indicates tampering, then determining the security policy of the die and the common security policy to indicate tampering;
   if the die type of the first other die indicates a master die, then determining the security policy of the die and the common security policy to indicate the security policy of the first other die;
   if the die type of the first other die indicates a slave die and the die type of the die indicates a master die, then determining the common security policy to indicate the security policy of the die; and
   if the die type of the first other die indicates a slave die and the die type of the die indicates a slave die, then determining the security policy of the die and the common security policy to indicate the received security policy of the first other die.

* * * * *